United States Patent
Tomomatsu (10) Patent No.: US 7,218,419 B2
(45) Date of Patent: May 15, 2007

(54) IMAGE PROCESSING METHOD AND APPARATUS, AND RECORDING MEDIUM

(75) Inventor: Yoshiaki Tomomatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 09/804,255

(22) Filed: Mar. 13, 2001

(65) Prior Publication Data

US 2001/0035967 A1 Nov. 1, 2001

(30) Foreign Application Priority Data

Apr. 27, 2000 (JP) .............................. 2000/127523

(51) Int. Cl.
  *H04N 1/405* (2006.01)
  *G06K 15/00* (2006.01)
(52) U.S. Cl. ...................... 358/3.14; 358/518; 358/530
(58) Field of Classification Search ................ 358/1.9, 358/3.13, 3.14, 3.06, 450, 453, 418; 382/173, 382/176, 285, 169; 345/418
  See application file for complete search history.

(56) References Cited

U.S. PATENT DOCUMENTS 4,672,462 A * 6/1987 Yamada ...................... 358/401
5,539,523 A * 7/1996 Nakai et al. ................. 358/296
5,949,964 A * 9/1999 Clouthier et al. .......... 358/3.06
5,963,665 A * 10/1999 Kim et al. ................... 382/169
6,008,812 A * 12/1999 Ueda et al. ................. 345/418
6,028,956 A * 2/2000 Shustorovich et al. ...... 382/156

OTHER PUBLICATIONS

U.S. Appl. No. 09/336,987, filed Jun. 21, 1999.

* cited by examiner

*Primary Examiner*—David Moore
*Assistant Examiner*—James A. Thompson
(74) *Attorney, Agent, or Firm*—Fitzpatrick, Cella, Harper & Scinto (57) ABSTRACT

A method that quickly corrects an image without inputting more than a required number of rendering instructions. Input image that contains a plurality of objects, and rendering command statements that specify rendering of the plurality of objects are input and analyzed in order to identify the types of objects. If a specific type of object is identified through the identification, a rendering command statement that specifies rendering of the specific type of object is re-input in order to correct the specific type of object. If the specific type of object is not identified through the identification, a rendering command statement needed for execution of image correction is not re-input.

8 Claims, 11 Drawing Sheets

TABLE [ ]

| INDEX | GROUP ID | RENDERING FUNCTION INFORMATION | SAMPLE INFORMATION |
|---|---|---|---|
| 0 | | Image info VALUE | Histgram Info VALUE |
| 1 | | Image info VALUE | Histgram Info VALUE |
| 2 | | Image info VALUE | Histgram Info VALUE |
| 3 | | Image info VALUE | Histgram Info VALUE |
| .. | .. | .. | .. |
| m | | Image info VALUE | Histgram Info VALUE |

FIG. 6

| Image Info VALUE |
|---|
| RENDERED POSITION : X |
| RENDERED POSITION : Y |
| RENDERED POSITION : W |
| RENDERED POSITION : H |

FIG. 7

| Histgram Info VALUE | BRIGHTNESS HISTOGRAM TABLE | CORRECTION NEEDED-OR-NOT FLAG | CORRECTION PARAMETER |
|---|---|---|---|

FIG. 8

TABLE [ ]

| INDEX | GROUP ID | RENDERING FUNCTION INFORMATION | SAMPLE INFORMATION |
|---|---|---|---|
| 0 | 0 | Image info 0 | Histgram Info 0 |
| 1 | 1 | Image info 1 | Histgram Info 1 |
| 2 | 0 | Image info 2 | Histgram Info 0 |
| 3 | 1 | Image info 3 | Histgram Info 0 |
| 4 | 1 | Image info 4 | Histgram Info 1 |

FIG. 9A (DATA CONTAINING PHOTOGRAPHIC IMAGE)

FIG. 9B (DATA NOT CONTAINING PHOTOGRAPHIC IMAGE)

FIG. 10A (DATA CONTAINING PHOTOGRAPHIC IMAGE)

FIG. 10B (DATA NOT CONTAINING PHOTOGRAPHIC IMAGE)

IMAGE PROCESSING METHOD AND APPARATUS, AND RECORDING MEDIUM

BACKGROUND OF THE INVENTION

1. Field of the Invention

The present invention relates to processing an input image that contains a plurality of objects.

2. Description of the Related Art

In order to properly output an output image to a printer or display device according to image data, it is necessary to perform color processing including color correction, color conversion, and binary coding on each of a plurality of objects constituting an output image according to a type of object. In general, for printing out or displaying an image created by a computer application, a device driver or a device translates a set of rendering instructions sent from the application into an image for a whole page that is represented by image data. The image is then printed out or displayed.

A set of rendering instructions constitutes a document. Among the rendering instructions issued to a device driver.

An image rendering instruction specifies rendering of a photographic picture. A text rendering instruction specifies rendering of a text. A graphic rendering instruction specifies rendering of a graphic. The device driver performs color processing suitable for an object according to an instruction, converts the resultant object into an image capable of being output from an output device, and outputs the image.

In recent years, a color management system permitting color processing optimal for each device, such as, ICM for the Microsoft Windows™ or ColorSync™ released from Apple Inc. has been installed in many computer systems.

However, even when such a color management system is installed, if an original photographic image is of very poor quality, a high-quality, high-definition output cannot naturally be provided. For example, when an image is produced using digital cameras, which have become popular in recent years, if the exposure is improper, the image having an improper exposure is printed with the improper exposure. An excellent output cannot be provided. To overcome this problem, a user may use image retouch software or the like to perform image correction such as nonlinear color balancing on the whole original image.

However, when a user who lacks expertise and experience on image correction attempts to correct an image, the process can be very frustrating and time consuming.

Assume that a document for desktop publishing (DTP) is an existing document that contains an original image to which a photograph that has not been corrected is pasted. In order to correct only the photograph in the original image, a complex task must be carried out. Specifically, the photograph in the original image must be designated and cut out, and then corrected using image retouch software. The resultant photograph is then pasted again to the original image.

For overcoming the aforesaid disadvantages, U.S. patent Ser. No. 09/336,987 filed on Jun. 11th, 1999 by an applicant, describes a process for automatically correcting object images of a predetermined type contained in an input image according to a color distribution.

In that application, a printer driver issues a request for print data (a set of rendering instructions), which specifies rendering of an image for a print page, twice to an application or an operating system (OS).

In the first print data processing flow, print data is analyzed in order to acquire information needed for image correction, that is, preparations are made for execution of image correction.

In the second print data processing flow, the result of acquisition performed in preparation for execution of image correction is used to correct part of the image rendering instructions that have been judged to be corrected. Color matching is executed, and the rendering instructions are translated into raster image data and the raster image data is developed into a page memory. A print image is then produced and transferred to a printer.

However, the number of data items per page has increased drastically partly because applications offer advanced performance. If every data is requested twice, a print start time instant is delayed by a time required for issuance of a first request and response to the first request. This greatly affects an image output speed. In particular, a request must be issued twice even for a page that contains no image. The decrease in the speed is undesired.

SUMMARY OF THE INVENTION

Accordingly, an object of the present invention is to make it possible to perform image correction quickly without the necessity of inputting more than a required number of rendering instructions.

In other words, an object of the present invention is to reduce processing time required for image correction.

According to one embodiment of the present invention, there is provided an image processing method for processing an input image containing a plurality of objects. Specifically, rendering command statements that specify rendering of the plurality of objects are input and analyzed in order to identify the types of objects. If a specific type of object is identified through identification, the rendering command statement that specifies rendering of the object is re-input in order to correct the specific type of object. If the specific type of object is not identified through identification, a rendering command statement needed for execution of image correction is not re-input.

According to another embodiment of the present invention, there is provided an image processing method for correcting a specific type of object in an input image, which contains a plurality of objects, under a condition for image correction dependent on a color distribution. Specifically, rendering command statements that specify rendering of objects belonging to a predetermined area in the input image are input. It is judged whether the rendering command statements each specify rendering of a specific type of object. If there is a possibility that an object thought to be the same as the specific type of object may be present in a subsequent predetermined area, a rendering command statement that specifies rendering of the object belonging to the subsequent predetermined area is input to make the judgment.

Other features and advantages of the present invention will be apparent from the following description taken in conjunction with the accompanying drawings, in which like reference characters designate the same or similar parts throughout the figures thereof.

Further objects, features and advantages of the present invention will become apparent from the following description of the preferred embodiments with reference to the attached drawings.

DESCRIPTION OF THE PREFERRED EMBODIMENTS

Figure 1:
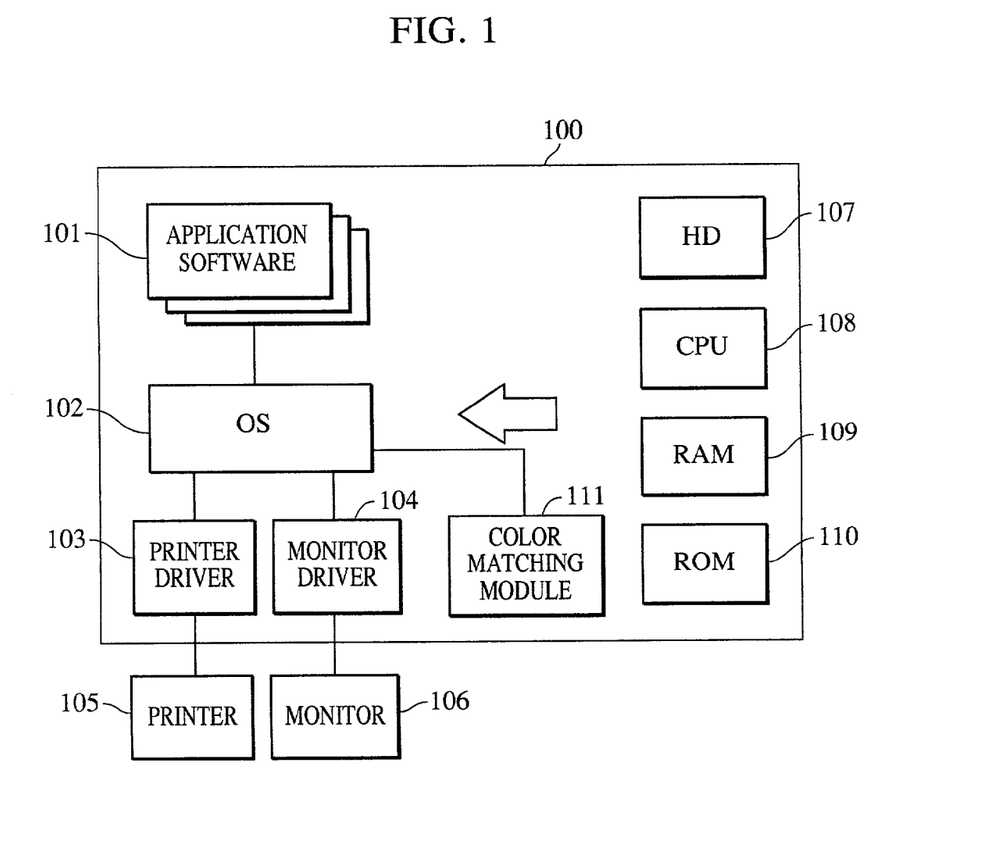
FIG. 1 is a block diagram of a system configuration.

The present invention will be described with reference to the drawings below. FIG. 1 schematically shows an example of a system in accordance with the present invention.

A printer 105, for example, an ink-jet printer and a monitor 106 are connected to a host computer 100. The host computer 100 has software such as application software 101, a printer driver 103, a monitor driver 104, and a color matching module 111 installed therein. The application software 101 includes a word-processing program, a spreadsheet program, and an Internet browser. The printer driver 103 processes a set of rendering instructions (an image rendering instruction, a text rendering instruction, and a graphic rendering instruction) that specify rendering of output images and that are issued from the applications to an operating system (OS) 102, and produces print data. The monitor driver 104 processes the set of rendering instructions issued from the applications, and displays an image on the monitor 106. The color matching module 111 performs color matching in response to a request issued from the driver or application. The host computer 100 includes a central processing unit (CPU) 108, a hard disk driver (HD) 107, a random access memory (RAM) 109, and a read-only memory (ROM) 110 as hardware devices on which the software can run.

The OS 102 is a program serving as a basis system residing in the computer 100. The OS 102 has an ability (system spooler) to spool a set of rendering instructions that is used to output an image for a page and issued from the applications.

The first embodiment of the system configuration shown in FIG. 1 is such that Microsoft Windows™ is adopted as an OS in a personal computer, an application enabling printing is installed, and a monitor and a printer are connected to the personal computer.

Figure 4:
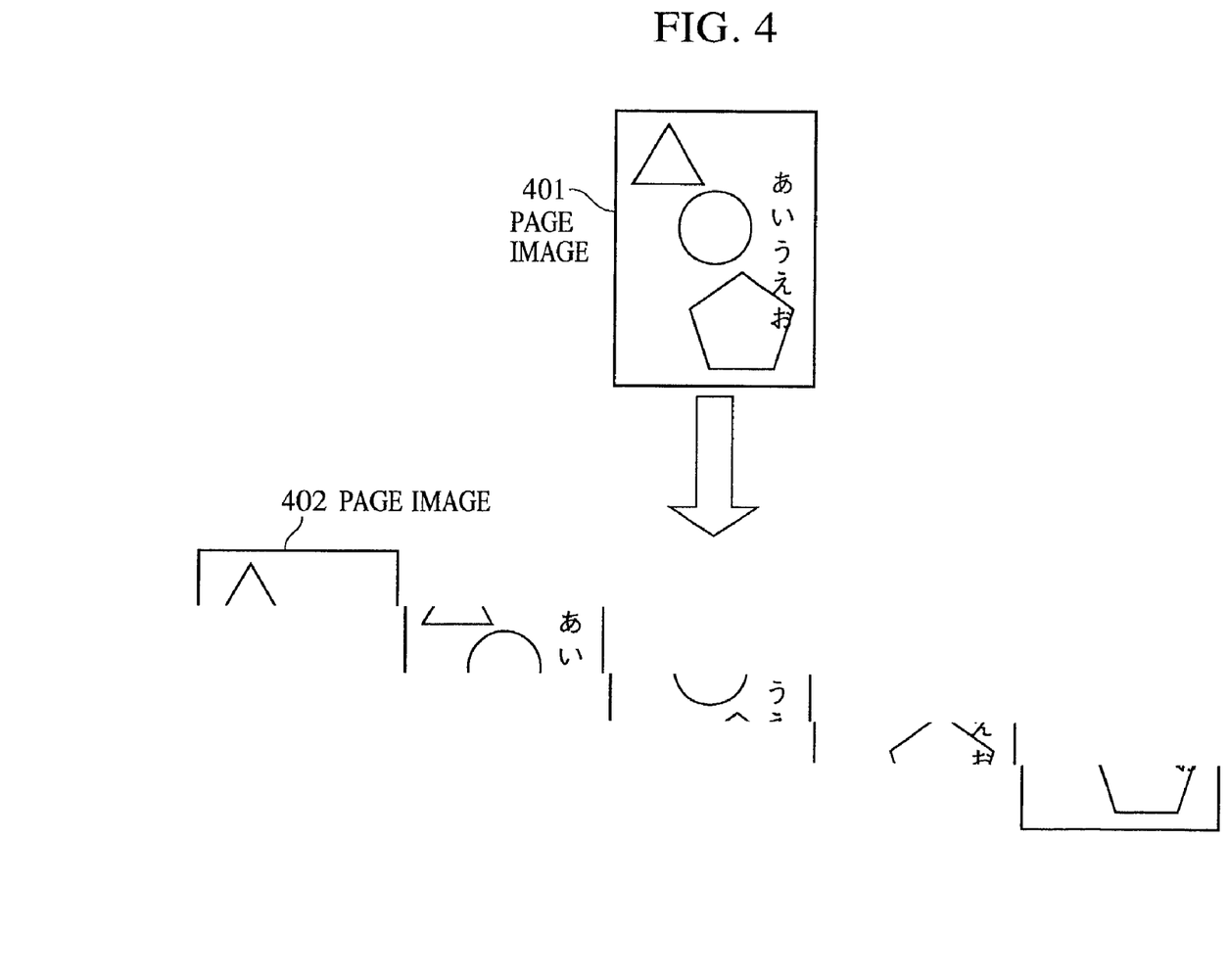
FIG. 4 is an explanatory diagram on the processing of dividing a page image into a plurality of bands.

At the host computer 100, an application 101 is activated to create output image data using text data, graphic data, and image data. The text data represents characters or the like classified into a text, the graphic data represents a graphic or the like classified into a graphic, and the image data represents an image classified into a natural image. In order to produce a printout based on the output image data, the application 101 issues a printout request to the OS 102, and also issues a set of rendering instructions, which specifies output images, to the OS 102. The set of rendering instructions include a graphic rendering instruction that specifies rendering of the graphic data, and an image rendering instruction that specifies rendering of the image data. The OS 102 spools the set of rendering instructions, and issues a print request and the set of rendering instructions to the printer driver 103, which drives the output printer, in response to the request output from the application. The printer driver 103 processes the print request and the set of rendering instructions, which are received from the OS 102, produces print data based on which the printer 105 can produce a printout, and transfers the print data to the printer 105. If the printer 105 is a raster printer, the printer driver 103 translates the rendering instructions output from the OS into raster data items of red, green and blue, and develops the raster data items into red, green, and blue 24-bit memories in units of a band. The printer driver 103 then converts the raster data items into data items of a format permitting the printer 105 to produce a printout, for example, cyan, magenta, yellow, and black image data items, and transfers the resultant image data items to the printer. Normally, an image for a page represented by the data items stored in the red, green, and blue 24-bit page memories is divided into a plurality of bands, and the data items are converted in units of a band. FIG. 4 shows an example of decomposing a page image into band images.

Next, printout processing performed by the printer driver 103 will be described below. The printout processing performed by the printer driver 103 falls broadly into five kinds of processing described below.

(1) Identification

A type of rendering instruction that specifies rendering of an object and is received from the OS 102 is identified to see whether the object whose rendering is specified by the rendering instruction is a photographic image, a text, or a graphic.

(2) Image Correction

Image correction corrects colors that are unbalanced due to a photographic condition or the like.

A histogram representing a frequency distribution of luminance levels in a photographic image is created in order to determine a condition for nonlinear balancing of colors. The unbalanced colors in the photographic image are then nonlinearly balanced, whereby color balance, a contrast, and saturation of the photographic image are optimized.

(3) Color Matching

The color matching module 111 performs color matching using a source profile portraying a source according to input color information contained in a rendering instruction, and a printer profile portraying a printer. The input color information is converted into printer-dependent color information.

(4) Producing and Developing Raster Data

Rendering instructions are translated into red, green, and blue raster data items, which represent a pixel comparable to a resolution offered by the printer, according to color information having undergone image correction and color matching. The red, green, and blue raster data items are developed into the red, green, and blue 24-bit page memories.

(5) Color Processing for Printer

The red, green, and blue raster data items are subjected to luminance-density conversion, masking, gamma correction, and n-ary coding, and thus converted into cyan, magenta, yellow, and black data items associated with cyan, magenta, yellow, and black recording agents employed in the printer.

A processing flow followed by the printer driver will be described in conjunction with FIG. 2 and FIG. 3.

For executing image correction, print data is analyzed in order to acquire information needed for image correction. Preparations are thus made for image correction. Using the information acquired in preparation for image correction, only image rendering instructions that specify rendering of objects judged to be corrected are corrected. Therefore, all information concerning the objects to be corrected must be acquired prior to image correction. Normally, an application divides one image into a plurality of portions and outputs the portions. This is intended to use a memory efficiently. In this case, since a driver treats an image in units of a band, the driver cannot acquire image data of bands succeeding a band whose image data is currently treated.

A printer driver issues a request for print data (whose rendering is specified by a set of rendering instructions), which represents a print image for one page, twice to an OS for the purpose of image correction. In response to each of the first and second requests, the OS issues the whole set of rendering instructions needed to output one page and spooled.

In the first print data processing flow (first print data processing pass), print data is analyzed in order to acquire information needed for image correction, and preparations are thus made for execution of image processing. In the second print data processing flow (pass), the information acquired in preparation for image correction is used to correct a portion of image rendering instructions that specifies rendering of objects contained in an image and judged to be corrected. The rendering instructions are subjected to color matching, and then translated into raster data. The raster data is developed into page memories. A print image is then produced and transferred to a printer.

Figure 2:
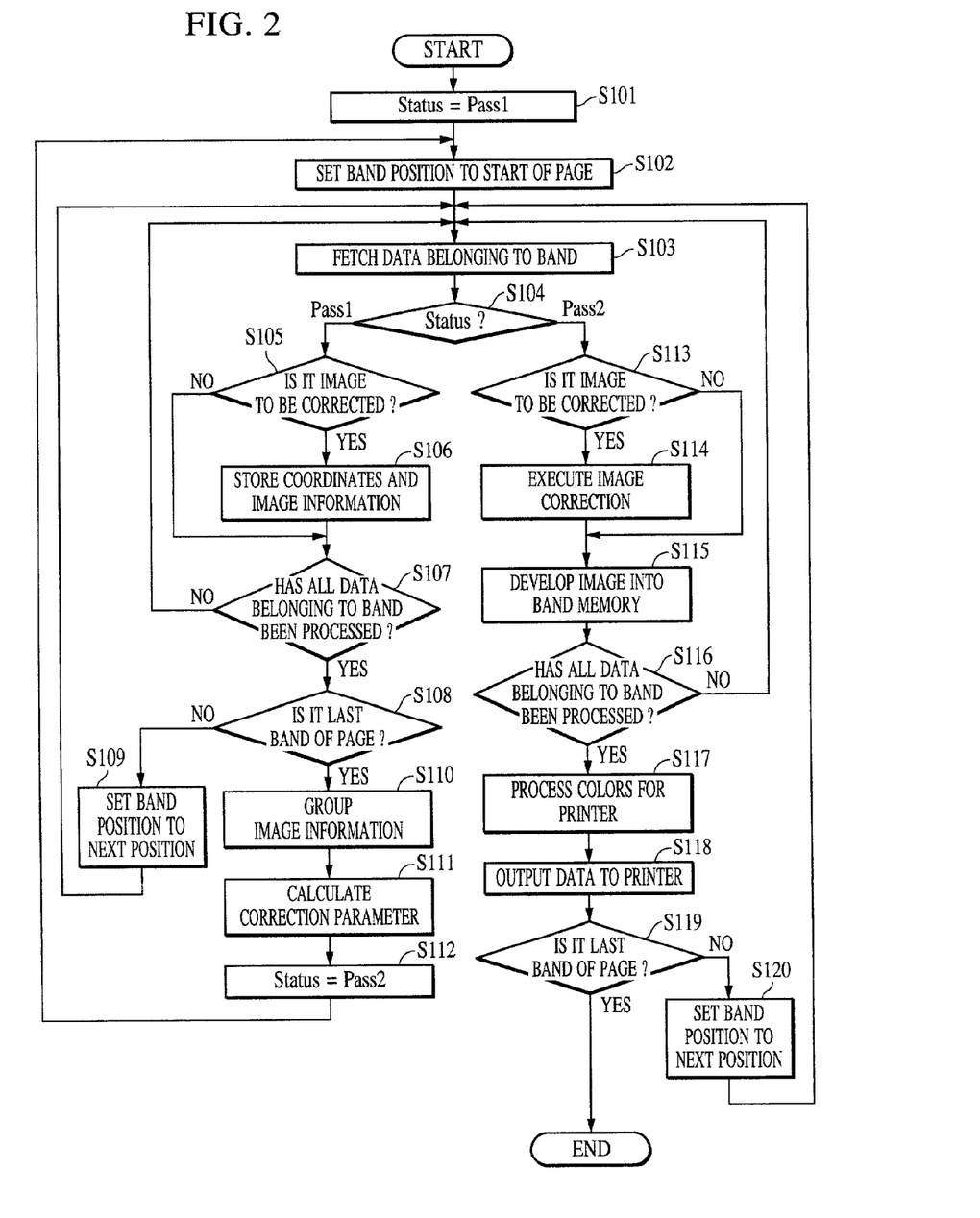
FIG. 2 is a flowchart describing image correction in accordance with the first embodiment.
Figures 3, 3A:
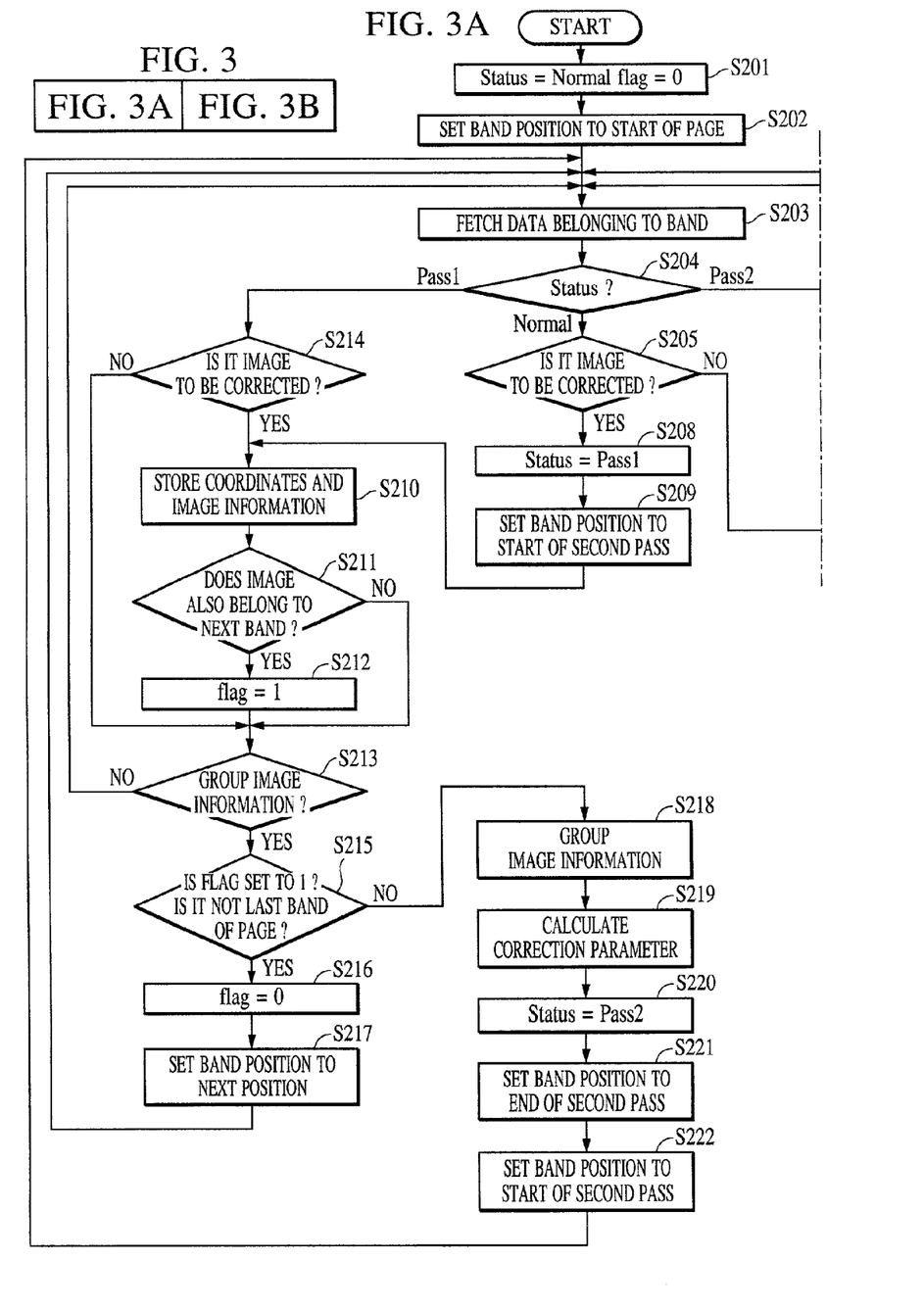
FIG. 3 is a flowchart describing image correction in accordance with the second embodiment.
Figure 3B:
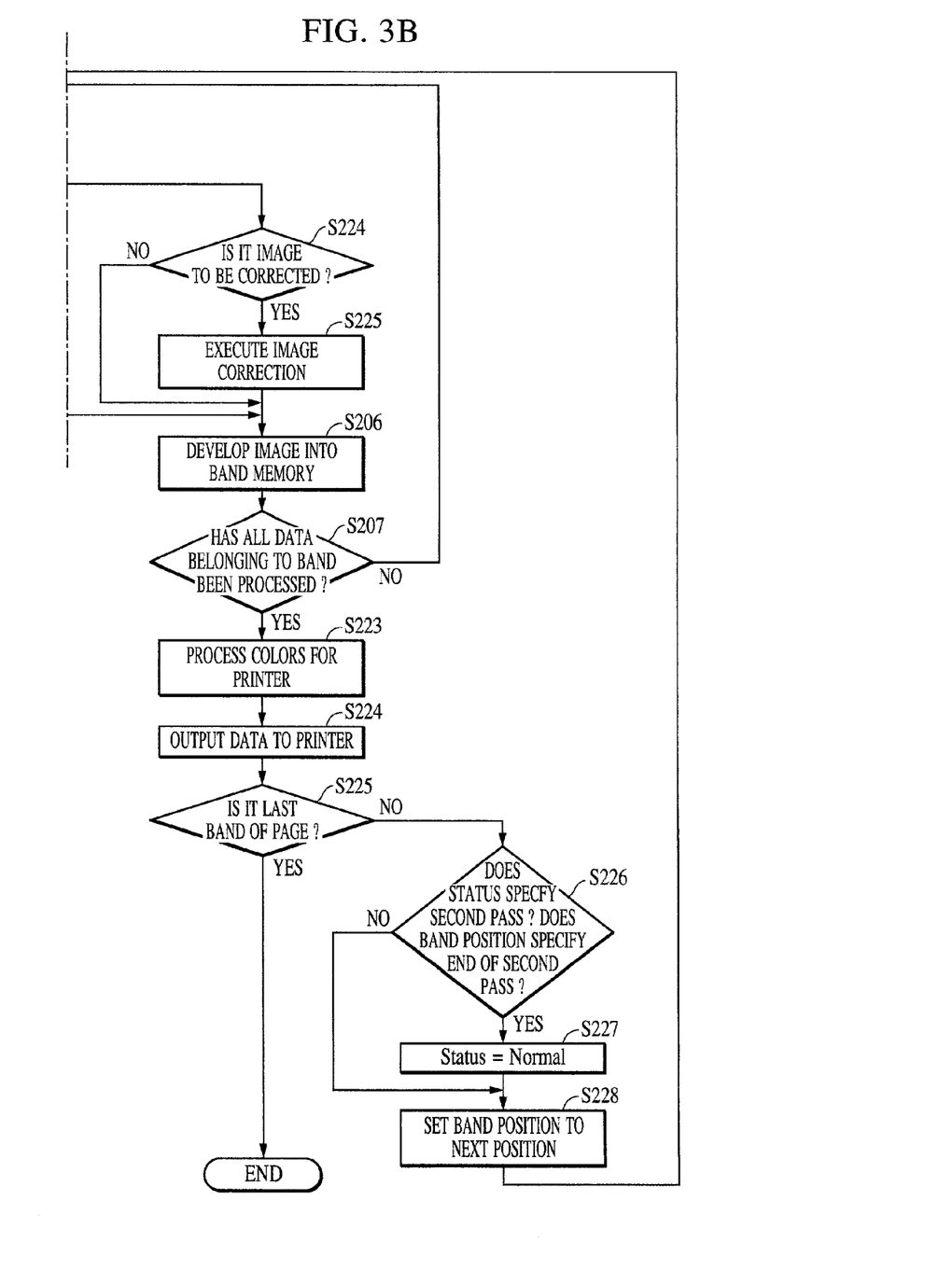

FIG. 2 is a flowchart describing image correction.

Normally, a driver divides an image for one page into a plurality of bands, and produces and develops raster data in page memories. This contributes to a reduction in the size of a large page memory. Therefore, in the second pass, the data is sampled in units of a band and processed. It is therefore unnecessary to divide a page image into a plurality of bands in the first pass. For processing the page image, the page image need not be divided into bands. However, some OSs cannot change the size of a band between the first and second passes. For this reason, it will be assumed, for discussion purposes, that a page image is divided into bands in the first pass alike.

At step S101, a program status word Status is initialized to the first pass Pass1. At step S102, the first band position is designated. Normally, a page image is vertically and laterally divided into bands. The left upper corner of the page image is designated as the initial band position. Alternatively, the bands may be treated from right to left or from down to up. In this case, the first band position indicated with coordinates is set to the initial position.

At step S103, rendering instructions that specify rendering of objects belonging to a band of the page image are selected from a set of rendering instructions. Normally, the OS performs the selection. When the printer driver informs the OS of the current band position, the OS reads rendering instructions, which specify rendering of data representing objects belonging to the band, from a spooler, and returns it.

At step S104, the program status word Status is checked. However, since Pass1 is initially specified in Status, control is passed to step S105. At step S105, it is checked if an object is an image to be corrected. Image correction employed in the present embodiment is the processing of correcting colors unbalanced due to a photographic condition or the like. The image to be corrected is a photographic image. In general, the photographic image is represented by red, green, and blue data items of 24 bits or more long. An original of an image represented by data of a smaller bit length (for example, an 8-bit palette) is often not a photograph and not regarded as the image to be corrected. Only when the bit length of data representing an image is 24 or more, control is passed to step S106. Otherwise, it is judged that the object is not the image to be corrected, and control is passed to step S107.

Figure 5:
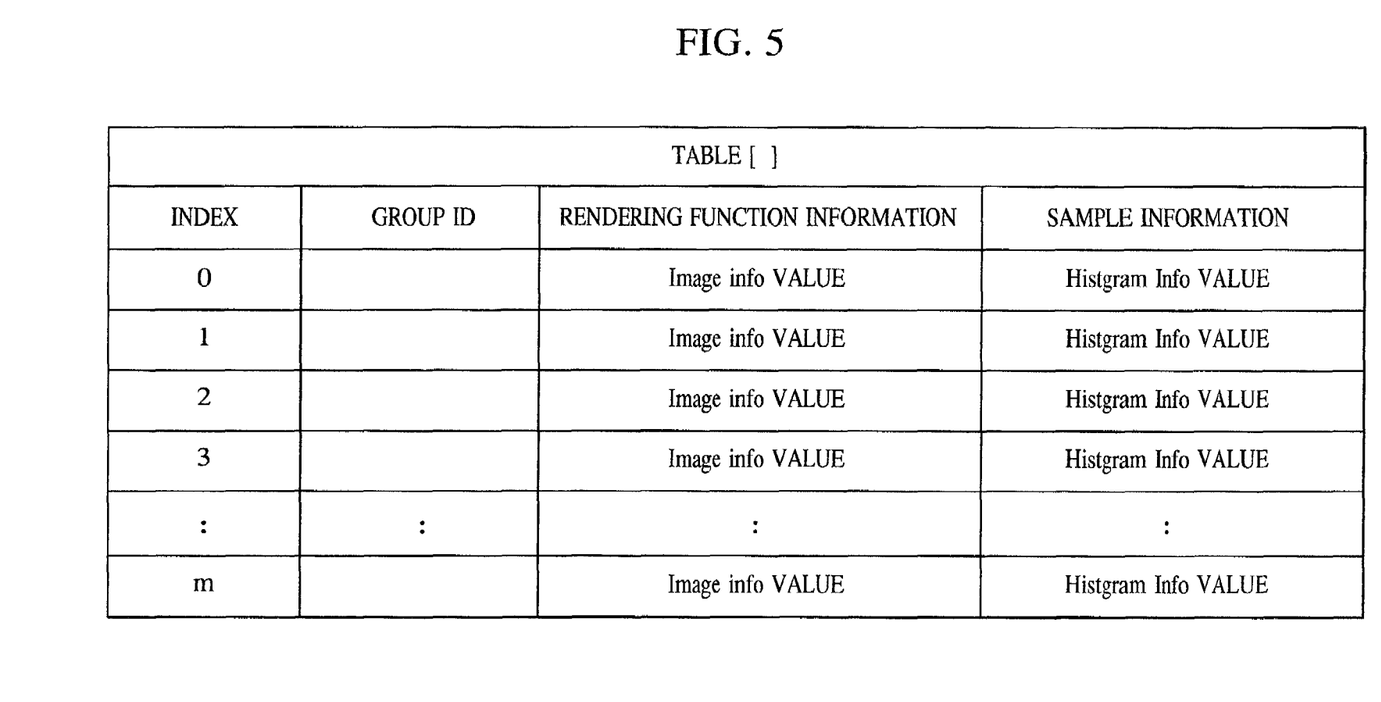
FIG. 5 shows an example of the structure of a table.
Figure 6:
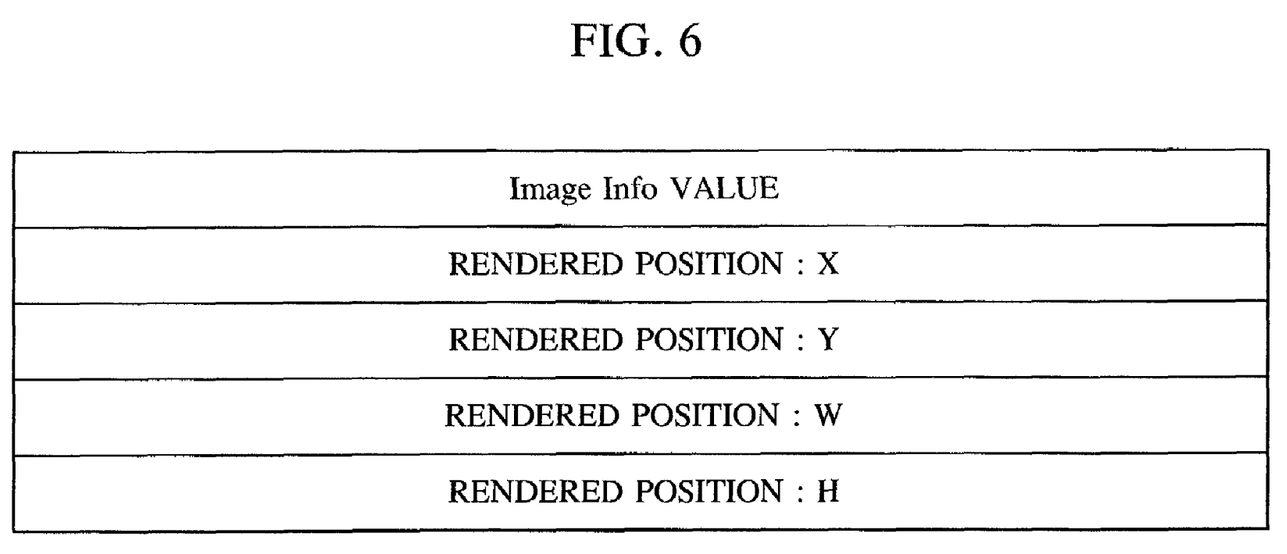
FIG. 6 shows an example of the contents of rendering instruction information Image Info.
Figure 7:
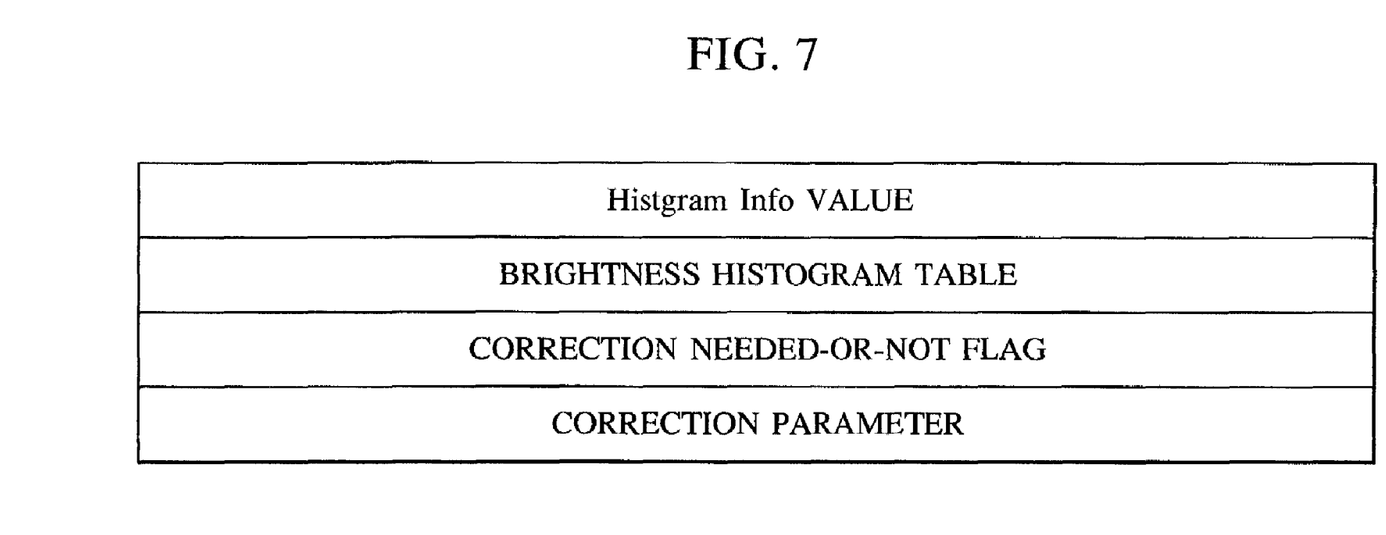
FIG. 7 shows an example of the contents of sample information Histogram Info.

At step S106, the object whose rendering is specified by the image rendering instruction is sampled in order to plot a histogram. A table shown in FIG. 5 is stored in the RAM. One entry is created in the table. Rendering instruction information contained in the image rendering instruction is entered in the table. FIG. 6 shows an example of the contents of rendering instruction information Image Info entered in the table. The contents of rendering instruction information are a rendered position at which an object should be rendered according to an image rendering instruction and which are indicated with coordinates X and Y, a width W of the object, and a height H thereof. Moreover, FIG. 7 shows the contents of sample information Histogram Info. At step S106, a histogram table alone is specified.

At step S107, it is judged whether data representing all objects belonging to the band has been processed. If not, the processing started at step S103 is repeated.

In contrast, if it is judged at step S107 that a current object is the last object belonging to the band, it is judged at step S108 whether the band is the last band of the page image. If the band is not the last band of the page image, the band position is advanced at step S109. Assuming that a page image is vertically divided into bands and data representing the page image is processed from up to down, a vertical size of each band is added to the band position. Thus, the band position is advanced to the next one. Thereafter, the processing succeeding step S103 is repeated.

In contrast, if it is judged at step S108 that the band is the last band of the page image, control is passed to step S110. By the time when control is passed to step S110, the same number of entries as the number of image rendering instructions, which specify rendering of objects that are images to be corrected contained in an output page, has been created in the image information table shown in FIG. 5. Rendering instruction information Image Info contained in a rendering instruction that specifies rendering of an object and sample information Histogram Info are specified in each entry. At step S110, the entries in the image information table are grouped. Some applications divide one image into portions and issue a plurality of image rendering instructions. Objects of one image that is divided into portions by an application are grouped portion by portion, and histograms concerning grouped objects are synthesized. Specifically, items of rendering instruction information Image Info specified in all entries in the table are compared mutually. Information items contained in a plurality of image rendering instructions that specify rendering of objects of one image that is divided into portions by an application are grouped portion by portion.

Various procedures are possible as a grouping procedure. A simple procedure will be described. Namely, items of rendering instruction information Image Info specified in all entries in the table are referenced mutually. Entries designating objects that are judged to adjoin according to the rendered position information of values X, Y, W, and H are classified into the same group. For example, coordinates X and widths W specified in two entries in the table agree with each other, and the sum of a coordinate Y and a height H specified in one of the entries agrees with a coordinate Y specified in the other entry. In this case, objects designated with the entries are judged to join each other.

When any other procedure is adopted for grouping, information to be specified in Image Info may be varied depending on the adopted procedure.

Figure 8:
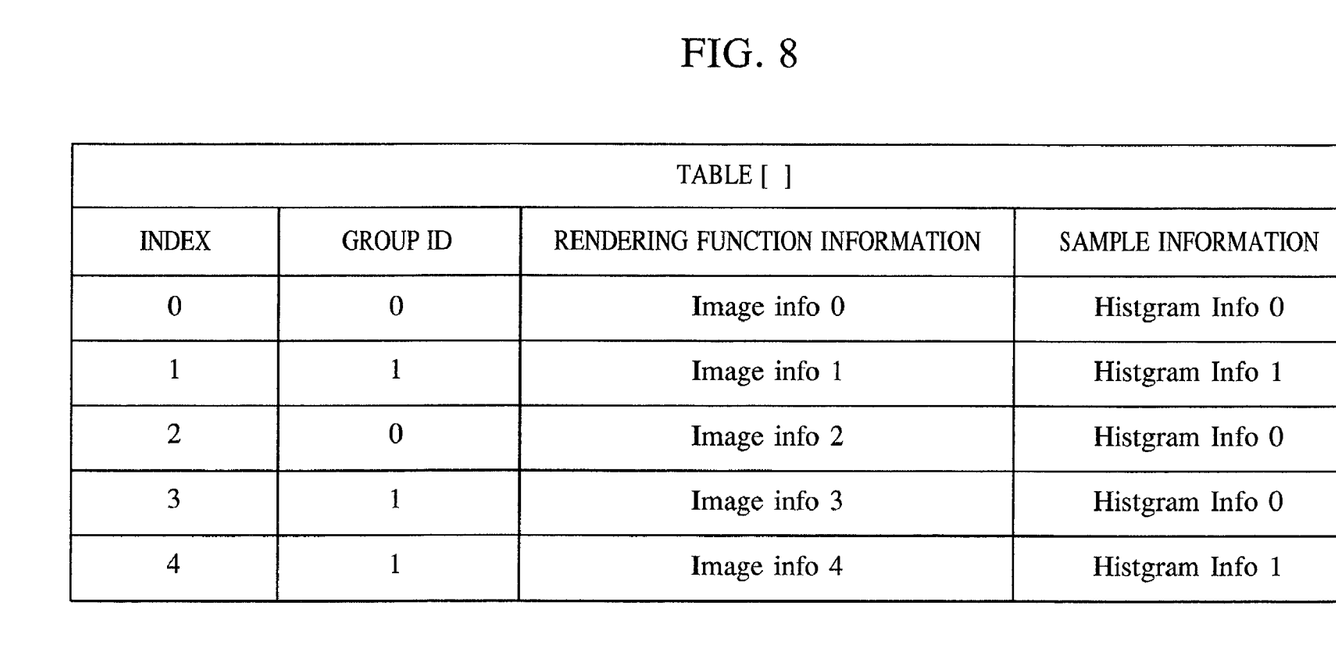
FIG. 8 shows an example of a table listing group ID numbers.

FIG. 8 shows the contents of the table in which group identification (ID) numbers determined as the result of judgment are entered. Objects designated with indices 0 and 2 are judged to belong to the same group, and 0 is specified as group ID numbers associated with the indices. 1 is specified as group ID numbers associated with indices 1, 3, and 4. After grouping is completed, sample information Histogram Info associated with the same group ID number is synthesized. For synthesizing sample information, the frequencies of the same luminance level are added up, and a new histogram is created. Consequently, the table shown in FIG. 8 has five entries but the entries are grouped into two entries.

At step S111, a histogram representing a frequency distribution of luminance levels in grouped objects is used to calculate a correction parameter employed in image correction. The result of the calculation is specified in Histogram Info in the entries with which the grouped objects are designated.

It may be judged from the histogram that correction is not needed. At step S111, whether correction is needed is judged and specified in a correction needed-or-not flag nested below Histogram Info.

The first print data processing flow or pass is thus completed. A step S112, the program status word Status is changed to the second pass Pass2. The processing of step S102 and thereafter is carried out.

All the steps ending at step S104 in the second pass are identical to those in the first pass. At step S113, it is judged similarly to at step S105 whether an object concerned is an image to be corrected. Since it may be judged at step S111 that correction is not needed, it is checked if information concerning an object is listed in the table created at step S106 and if the correction needed-or-not flag specified in Histogram Info at step S111 is set to Correction Needed. However, some correction methods do not judge at step S111 that correction is not needed. In this case, it may be checked at step S106 if information concerning an object is listed in the table.

If it is judged at step S113 that the object is an image to be corrected, a correction parameter specified in Histogram Info entered in the table created at step S106 or S111 is used to execute image correction. Control is then passed to step S155. If it is judged at step S133 that the object is not an image to be corrected, step S114 is skipped and control is passed to step S115.

At step S115, raster data is, as mentioned above, produced and developed into the band memories. At step S116, it is checked if data representing all objects belonging to the band has been processed. If the data representing all the objects has not been processed, the processing started at step S103 is repeated. If the data representing all the objects has been processed, the data in the band memories is subjected to printer-dependent color processing at step S117 so that the data can be output to the printer. The resultant data is then output to the printer at step S118. At step S119, it is judged whether data representing all the objects belonging to all bands in the page image has been processed. If not, the next band position is designated at step S120. The processing started at step S103 is repeated. If it is judged at step S119 that the band is the last band of the image page, the sequence is terminated.

As mentioned above, a histogram representing a frequency distribution of luminance levels in a photographic image is created in order to find out a condition for nonlinear color balancing. Nonlinear color balancing is then performed on the photographic image. Consequently, color balance, a contrast, and saturation in the photographic image can be optimized.

Figure 9A:
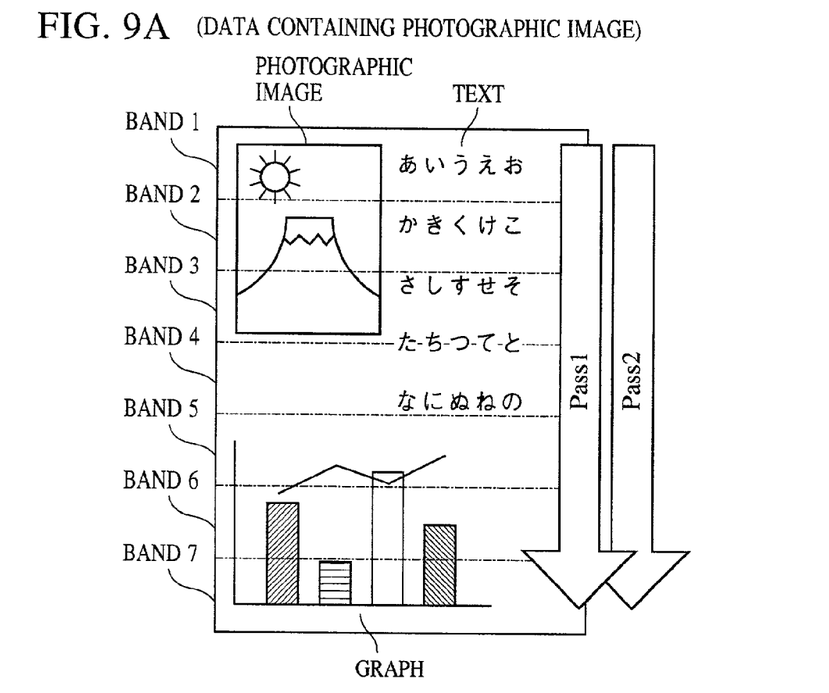
FIG. 9A and FIG. 9B show two passes of print data processing in accordance with the first embodiment.
Figure 9B:
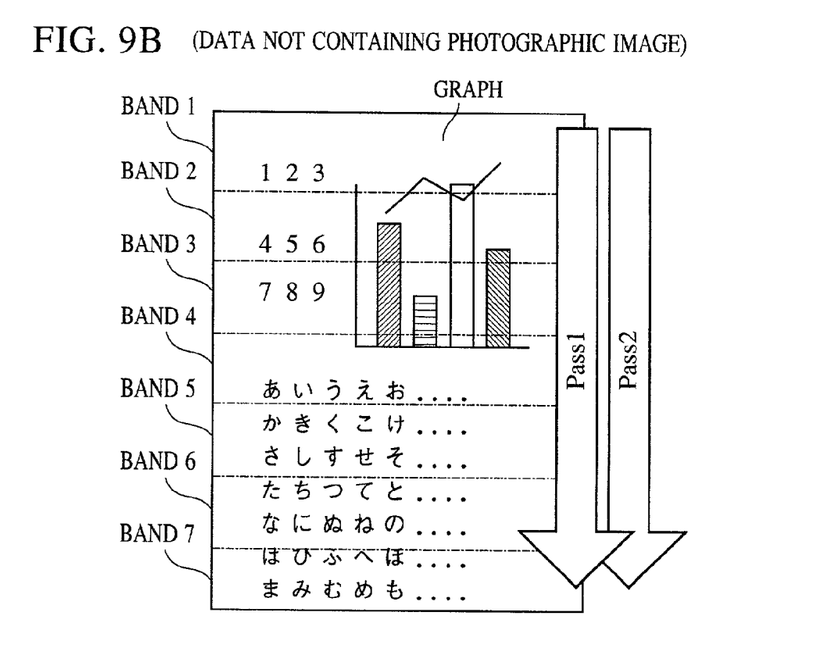

According to the two-pass processing method employed in the first embodiment, as shown in FIG. 9A and FIG. 9B, a request for print data is issued twice per band irrespective of whether an object contained in a photographic image is present in the band. Recently, data has become more and more complex. Therefore, it takes time to respond a request for print data representing an entire page image. In particular, even when a request for print data is issued twice, if the print data represents a page image containing no photographic image, the first issuance leads to no processing and is therefore of no use. This reduces processing speed.

According to a second embodiment, a request for print data is issued twice for a band of a page image for which two times of issuance are needed. This is intended to increase processing speed. For example, as shown in FIG. 9A, a photographic image may be present in some bands. In this case, a request for print data is issued twice for processing data that represents an object, that is, the photographic image belonging to band 1 to band 3. The request for print data is issued once for processing data that represents objects belonging to band 4 and subsequent bands. Moreover, a page image may contain no photographic image as shown in FIG. 9B. In this case, the request for print data is issued once. A decrease in processing speed deriving from two passes of processing is thus prevented.

Image correction will be described below. FIG. 3 is a flowchart showing a flow of image processing.

At step S201, a variable is initialized. A normal status Normal is included in addition to the first pass status Pass1 and second pass status Pass2 employed in the first embodiment. The initial value specified in Status is Normal. In the normal status, data that represents an object that is not an image to be corrected is developed into the band memories in the same manner as when image correction is not performed. A flag indicates whether an object that is an image to be corrected exists over bands, though it will be detailed later. The initial value of the flag is 0 indicating that an object that is an image to be corrected does not exist over bands.

At steps S202 and S203, similarly to those in the first embodiment, the band position is initialized, and then data representing objects belonging to a band is sampled. At step S24, the program status word Status is checked. Since Normal is initially specified in Status, control is passed to step S205. At step S205, it is checked whether an object is an image to be corrected. Similarly to step S105, only when the object is represented with data of 24 bits or more, control is passed to step S208. Otherwise, the object is judged not to be an image to be corrected. Control is then passed to step S206.

At step S206, raster data is, as mentioned above, produced and developed into the band memories.

At step S207, it is judged if a current band is the last band of a page image. If not, the processing started at step S203 is repeated until the current band becomes the last band thereof or an object that is an image to be corrected is detected.

Next, a description will be made of processing to be performed when it is judged at step S205 that a current object is an image to be corrected. If it is judged at step S205 that the object is an image to be corrected, two passes of processing are needed for the band containing the object. Control is then passed to step S208. Normal specified in Status is changed to Pass1. At step S209, the current band position is set to the start point for two passes of processing, that is, to 2PassStart.

Thereafter, at step S210, rendering instruction information Image Info and sample information Histogram Info are entered in the table. At step S211, an object concerning to which a histogram is plotted is extended to the next band. If the object is split and extended over bands, the remaining part of the object may be output with processing of data representing objects that belong to the next band. For this reason, the first pass of processing must involve the objects belonging to the next band. It is therefore judged at step S211 whether the rendered position of the object covers a border between bands. It is then judged from the result of judgment whether the object is extended to the next band. If it is judged that the object is extended to the next band, the flag is set to 1 at step S212.

Thereafter, it is judged whether the processing of data that represents all objects belonging to a current band has been completed. If processing of data has not been completed, the processing started at step S203 is performed. At this time, when control is returned to step S203, Pass1 is specified in Status. Step S204 is succeeded by step S214.

At step S214, similar to step S205, it is checked if a current object is an image to be corrected. If not, nothing need be performed in the first pass Pass1. Control is passed to step S213. If it is judged at step S214 that the object is an image to be corrected, processing from step S210 to step S213 is performed.

Next, a description will be made of a case where it is judged at step S213 that a current band is the last band of a page image. If it is judged that the current band is the last band of the page image, control is passed to step S215. At step S215, it is judged whether data that represents all objects belonging to the next band is also processed in the first pass. If it is judged at step S211 that an object concerning which a histogram has been plotted is extended to the next band, the flag is set to 1 at step S212, and the current band is not the last one of the page image, the data that represents all the objects belonging to the next band must also be processed in the first pass. Control is passed to step S216.

At step S216, the flag is set back to 0. At step S217, the next band position is designated. As for the band position, for example, when a page image is vertically divided into bands and data that represents the page image is processed from up to down, a vertical size of a band is added to a current band position. Thus, the next band position is designated. Thereafter, the processing started at step S203 is repeated.

In contrast, if it is found at step S215 that the current band is the last band of the page image or the flag is set to 0, the second pass of processing is performed to process the data that represents the objects belonging to the band and that has been processed in the first pass. First, at step S218, similar to step S110, objects contained in one image, which is divided into bands by an application, are grouped in order to synthesize histograms concerning the objects.

At step S219, similar to step S111, the synthetic histogram representing a frequency distribution of luminance levels in the grouped objects is used to calculate a correction parameter employed in image correction. Moreover, it is judged whether correction is needed.

The first pass of print data processing is terminated. At step S220, Pass2 is specified in Status.

The second pass Pass2 is performed to process data that represents all the objects belonging to a band and that has been processed in the first pass Pass1. It will be judged later whether the second pass is terminated. At step S221, therefore, the current band position is set to the end point for the second pass, that is, to 2PassEnd.

At step S222, the first band position for the second pass Pass2 is designated. At step S209, the start point for the second pass, that is, 2PassStart is regarded as the band position. Control is then returned to step S203.

Thereafter, step S204 is performed. Since Pass2 is specified in Status, control is passed to step S224. At step S224, similarly to at step S113, it is judged whether a current object is an image to be corrected. If it is judged that the current object is an image to be corrected, image correction is performed at step S225, and control is passed to step S206, which has been described previously. In contrast, if the current object is not an image to be corrected, step S225 is skipped and control is returned to step S206. Step S207, which has been described previously, is then performed.

Next, a description will be made of a case where it is judged at step S207 that the current band is the last band of a page image. If it is judged at step S207 that the current band is the last band of the page image, it means that data, which represents objects belonging to all bands of a page image, has been processed. The data in the band memories is output to the printer. First, at step S223, printer-dependent color processing is performed as mentioned previously. At step S224, the resultant data is output to the printer.

Thereafter, it is judged at step S255 whether the current band is the last band of the page image. If so, the sequence is terminated. In contrast, if it is judged at step S225 that the current band is not the last band of the page image, data that represents objects belonging to the next band is processed. If Pass2 is currently specified in Status, it is judged whether the second pass Pass2 has been terminated. It is checked at step S226 if Pass2 is specified in Status and the current band position is set to 2PassEnd.

If it is found at step S226 that Pass2 is specified in Status and the current band position is set to 2PassEnd, the second pass Pass2 terminates. At step S227, therefore, the value specified in Status is returned to Normal. At step S228, the next band position is designated. The processing started at step S203 is repeated. Even after the value specified in Status is returned to Normal, if an object is judged as an image to be corrected, the first and second passes are repeated. The sequence is repeated until it is judged at step S225 that the current band is the last band of the page image.

Figure 10A:
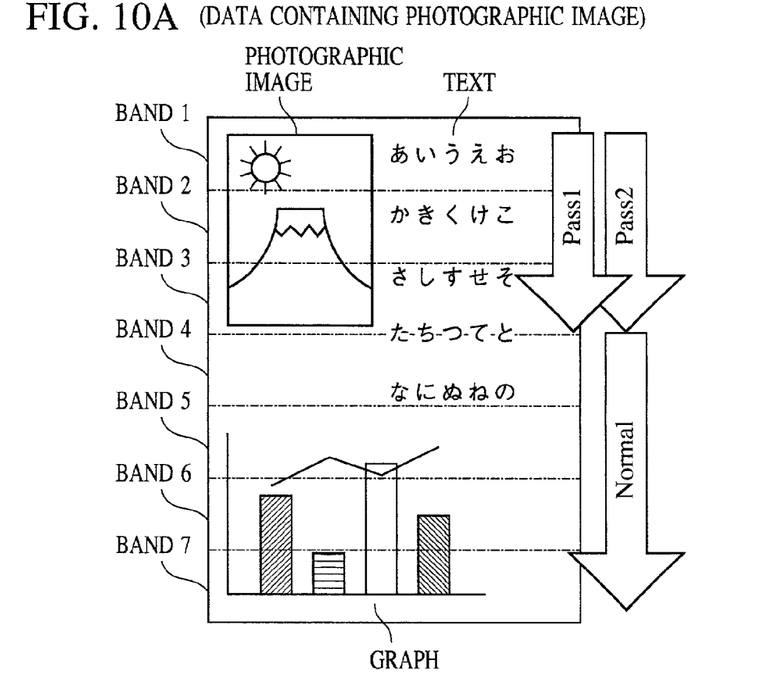
FIG. 10A and FIG. 10B show two passes of print data processing in accordance with the second embodiment.
Figure 10B:
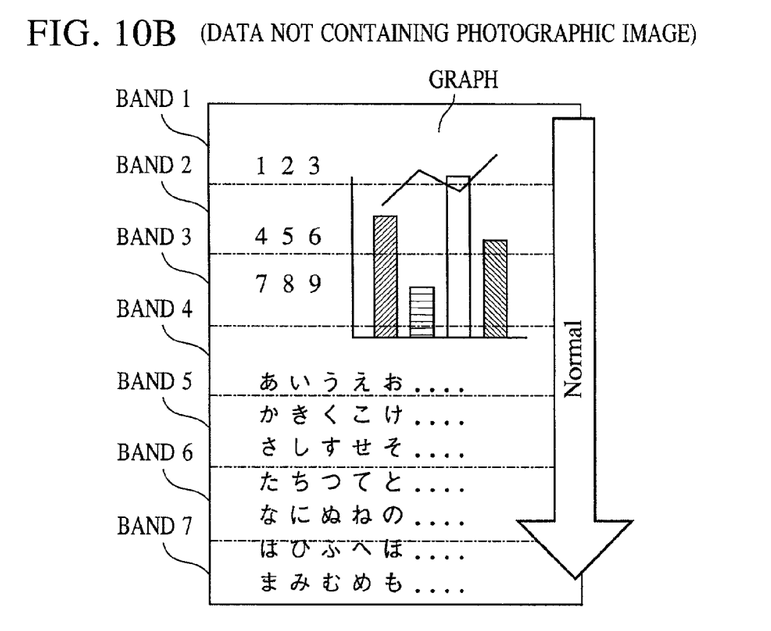

As mentioned above, two passes of processing are executed for a band for which the two passes are needed. FIG. 10A and FIG. 10B show the results of processing the same data as FIG. 9A and FIG. 9B according to the second embodiment. When an image contains a photographic image as shown in FIG. 10A, data that represents an object of the image, that is, the photographic image belonging to band 1 to band 3 is processed in two passes. Data that represents objects belonging to the remaining bands is processed with the program status word set to Normal, and two passes of processing are not carried out. When an image contains no photographic image as shown in FIG. 10B, two passes of processing are not performed to process data that represents objects belonging to all bands of the image, and the data is therefore processed quickly.

According to the present embodiment, an area in an image for which a request for data is issued twice can be minimized and a decrease in processing speed can be avoided. In particular, a decrease in processing speed occurring when data representing a page image that does not contain a photographic image is processed can be avoided almost completely.

Specifically, when a predetermined type of object contained in an input image is automatically corrected based on a color distribution, the number of areas in the input images for which a request for data is issued twice is minimized to thus minimize a reduction in processing speed. In particular, a decrease in processing speed occurring when data representing a page image that does not contain a photographic image is processed can be nearly completely avoided.

In the aforesaid embodiments, histograms are grouped after the first pass Pass1 is completed. Alternatively, before a histogram representing a frequency distribution of luminance levels in each object contained in an image is plotted, objects may be grouped. In this case, the number of tables each detailing sample information Histogram Info can be decreased.

According to another embodiment, a software program for realizing the facility in accordance with the aforesaid embodiment (for example, the facility described in the flowchart of FIG. 2 or FIG. 3) is installed in a computer included in an apparatus or system. The computer is connected to various types of devices so that the devices will cooperate with the facility in accordance with the aforesaid embodiment. The computer (CPU or MPU) included in the system or apparatus is acted according to the installed program, thus causing various types of devices to act accordingly.

Moreover, the software program itself realizes the facility in accordance with the aforesaid embodiment. The program itself, and a means for use in installing the program in the computer, for example, a recording medium in which the program is stored are features of the present invention.

The recording medium in which the program is stored includes, for example, a floppy disk, a hard disk, an optical disk, a magnetooptical disk, a CD-ROM, a magnetic tape, a nonvolatile memory card, and a ROM.

Moreover, when the computer runs the installed program, the facility in accordance with the aforesaid embodiment is realized. Even when the program acts in cooperation with an operating system (OS) that resides in the computer or any other application software in order to realize the facility in accordance with the aforesaid embodiment, the program is an embodiment of the present invention.

According to another embodiment, a supplied program is stored in a memory included in a functional extension board included in a computer or a functional extension unit connected to the computer. Thereafter, a CPU or the like mounted on or in the functional extension board or functional extension unit performs part or the whole of actual processing according to instructions described in the program. The processing realizes the aforesaid facility in accordance with the embodiment.

Many different embodiments of the present invention can be made without departing from the spirit and scope thereof, it is to be understood that the invention is not limited to the specific embodiments thereof except as defined in the appended claims.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method for developing an image indicated by a rendering command of an input image in a memory for each predetermined region of the input image and thereby generating an output image, said method comprising the steps of:
    acquiring a rendering command indicating an object image;
    analyzing the rendering command and determining whether the object image is of a specific image type or not;
    developing an image corresponding to the rendering command in the memory, acquiring a next rendering command, and carrying out said determination on the next rendering command when it is determined that the object image is not of the specific image type;
    acquiring a color distribution of the object image when it is determined that the object image is of the specific image type;
    carrying out said acquisition of the rendering command, said determination of whether the object image is of the specific image type, and said development of the image corresponding to the rendering command for each predetermined region when it is determined that the object image is not of the specific image type and carrying out said acquisition of the color distribution for each predetermined region when it is determined that the object image is of the specific image type;
    outputting the developed image which is developed in the memory when there is no object image of the specific image type in the predetermined region, and
    reacquiring the rendering command indicating the object image in the predetermined region, carrying out an image correction process on the object image of the specific image type according to the acquired color distribution, developing the image corresponding to the reacquired rendering command in the memory and outputting the developed image corresponding to the reacquired rendering command when it is determined that the object image is of the specific image type.

2. An image processing method according to claim 1, wherein said specific image type is a photographic image.

3. An image processing method according to claim 1, further comprising:
    an outputting step for outputting the developed image outputted in said reacquiring step to an image formation unit;
    wherein said image processing method is executed by a printer driver; and
    said rendering command is inputted from an operating system.

4. An image processing method according to claim 1, wherein when an object image considered to be identical to an object image determined to be of the specific type in a particular predetermined region is contained in the next predetermined region, a rendering command belonging to the next predetermined region is acquired and said determination and said acquisition of the color distribution are carried out.

5. An image processing method according to claim 1, further comprising the step of determining whether a plurality of object images determined to be the images of the specific type are identical or not, and carrying out the image correction process on the plurality of object images determined to be identical under an identical image correction condition.

6. An image processing method according to claim 5, wherein when the object image determined to be an image of the specific type is located on the border between said predetermined region and the next predetermined region, it is determined that the object image considered to be an identical image is contained in the next predetermined region.

7. An image processing apparatus for developing an image indicated by a rendering command of an input image in a memory for each predetermined region of the input image and thereby generating an output image, said apparatus comprising:
  a rendering-command acquisition device configured to acquire a rendering command indicating an object image;
  a rendering-command analyzer configured to analyze the acquired rendering command and to determine whether the object image is of a specific image type or not;
  means for developing an image corresponding to the rendering command in the memory, for causing said rendering-command acquisition device to acquire a next rendering command, and for causing said rendering-command analyzer to carry out the determination of whether the object image is of a specific image type or not on the next rendering command when said rendering-command analyzer determines that the object image is not of the specific image type;
  a color-distribution acquisition device configured to acquire a color distribution of the object image when said rendering-command analyzer determines that the object image is of the specific image type;
  means for causing i) said rendering-command acquisition device to acquire the rendering command, ii) said rendering-command analyzer to determine whether the object image is of the specific image type, and iii) said developing means to develop the image corresponding to the rendering command for each predetermined region, when said rendering-command analyzer determines that the object image is not of the specific image type, and for causing said color-distribution acquisition device to carry out the acquisition of the color distribution for each predetermined region when said rendering-command analyzer determines that the object image is of the specific image type;
  an output device configured to output the developed image which is developed in the memory when said rendering-command analyzer determines there is no object image of the specific image type in the predetermined region, and
  means for causing said rendering-command acquisition device to reacquire the rendering command indicating the object image in the predetermined region, for carrying out an image correction process on the object image of the specific image type according to the acquired color distribution, for causing said developing means to develop the image corresponding to the reacquired rendering command in the memory, and for causing the output device to output the developed image corresponding to the reacquired rendering command when said rendering-command analyzer determines that the object image is of the specific image type.

8. A computer-readable recording medium in which a program readable by a computer is recorded, the program instructing the computer to perform an image processing method for developing an image indicated by a rendering command of an input image in a memory for each predetermined region of the input image and thereby generating an output image, said method comprising the steps of:
  acquiring a rendering command indicating an object image;
  analyzing the rendering command and determining whether the object image is of a specific image type or not;
  developing an image corresponding to the rendering command in the memory, acquiring a next rendering command, and carrying out said determination on the next rendering command when it is determined that the object image is not of the specific image type;
  acquiring a color distribution of the object image when it is determined that the object image is of the specific image type;
  carrying out said acquisition of the rendering command, said determination of whether the object image is of the specific image type, and said development of the image corresponding to the rendering command for each predetermined region when it is determined that the object image is not of the specific image type and carrying out said acquisition of the color distribution for each predetermined region when it is determined that the object image is of the specific image type;
  outputting the developed image which is developed in the memory when there is no object image of the specific image type in the predetermined region, and
  reacquiring the rendering command indicating the object image in the predetermined region, carrying out an image correction process on the object image of the specific image type according to the acquired color distribution, developing the image corresponding to the reacquired rendering command in the memory and outputting the developed image corresponding to the reacquired rendering command when it is determined that the object image is of the specific image type.

* * * * *

UNITED STATES PATENT AND TRADEMARK OFFICE
CERTIFICATE OF CORRECTION

PATENT NO. : 7,218,419 B2  Page 1 of 1
APPLICATION NO. : 09/804255
DATED : May 15, 2007
INVENTOR(S) : Yoshiaki Tomomatsu It is certified that error appears in the above-identified patent and that said Letters Patent is hereby corrected as shown below:

SHEET 6:

Figure 5, "Histgram" (all occurrences) should read --Histogram--.

SHEET 8:

Figure 7, "Histgram" should read --Histogram--.

SHEET 9:

Figure 8, "Histgram" (all occurrences) should read --Histogram--.

COLUMN 1:

Line 23, "issued" should read --are instructions issued--.

COLUMN 8:

Line 16, "respond" should read --respond to--; and Line 53, "S24," should read --S204,--.

Signed and Sealed this

Sixteenth Day of September, 2008

JON W. DUDAS
*Director of the United States Patent and Trademark Office*